United States Patent [19]
Pollmann

[11] Patent Number: 6,070,686
[45] Date of Patent: Jun. 6, 2000

[54] STEERING WHEEL MOUNT FOR A STEERING WHEEL OF A VEHICLE

[75] Inventor: Gert Pollmann, Boehmfeld, Germany

[73] Assignee: Robert Bosch GmbH, Stuttgart, Germany

[21] Appl. No.: 08/973,655

[22] PCT Filed: Jun. 18, 1996

[86] PCT No.: PCT/DE96/01070

§ 371 Date: Dec. 18, 1997

§ 102(e) Date: Dec. 18, 1997

[87] PCT Pub. No.: WO97/01476

PCT Pub. Date: Jan. 16, 1997

[30] Foreign Application Priority Data

Jun. 27, 1995 [DE] Germany ............... 195 23 214

[51] Int. Cl.⁷ ................................................. B60R 25/00
[52] U.S. Cl. .................................. 180/287; 180/287
[58] Field of Search .................... 280/775; 180/287; 70/207, 208, 237, 209; 74/493, 554

[56] References Cited

U.S. PATENT DOCUMENTS 5,025,646  6/1991  Waguespack, Jr. ............... 70/209
5,113,716  5/1992  Dumschat et al. ............... 74/493

FOREIGN PATENT DOCUMENTS

3725908A1  2/1989  Germany .

*Primary Examiner*—Lanna Mai
*Assistant Examiner*—Kevin McKinley
*Attorney, Agent, or Firm*—Kenyon & Kenyon

[57] ABSTRACT

An adjusting device for a steering wheel in which the steering wheel can be displaced in a direction approximately parallel to the steering column on which the steering wheel is mounted.

13 Claims, 2 Drawing Sheets

STEERING WHEEL MOUNT FOR A STEERING WHEEL OF A VEHICLE

FIELD OF THE INVENTION

The invention relates to an adjusting device for a steering wheel.

BACKGROUND INFORMATION

There are known adjusting devices for steering wheels in motor vehicles that permit an adjustment of the height of the steering wheel together with the steering column which holds the steering wheel by means of a swiveling movement, so that the driver of the motor vehicle can adjust the height of the steering wheel as needed. For example, a swiveling foot that can be operated manually by a crank may be provided on the steering column to adjust the height. It is known that the steering wheel can be pivoted out of the way so that more room is available to the driver for movement when entering and exiting the vehicle. Here again, the steering column together with the steering wheel is moved around a swiveling foot.

SUMMARY OF THE INVENTION

The adjusting device according to the present invention has the advantage over the related art that due to the displaceability in the direction of the steering column, less space is required in the motor vehicle for adjusting the steering wheel, thus yielding even greater freedom of movement for the driver of the vehicle. Furthermore, the mechanism of a steering wheel that can be displaced in this way can be manufactured especially easily, and the casing for accommodating the steering column is less expensive.

A steering wheel locking device has the advantage that it makes attempted theft of the vehicle difficult.

Locking or unlocking the steering wheel by means of the steering wheel locking device when displacing the steering wheel combines in an advantageous manner a displacement of the steering wheel for convenient entry into or exit from the vehicle with automatic locking or unlocking, which is usually desired in entering into or exiting from a vehicle, so that active locking or unlocking becomes unnecessary.

This has also proven to be space-saving and inexpensive to manufacture if the steering wheel locking device is arranged on the casing of a display instrument located behind the steering wheel.

Furthermore, the tumbler lock for locking and unlocking the steering wheel by means of the steering wheel locking device can also be arranged on the casing, so the locking and unlocking of the steering wheel locking device can be combined well in the same space with the tumbler lock and is in advantageous proximity to a person operating this lock.

A lock bar element that engages in the steering wheel and prevents steering is a reliable antitheft device and is especially obvious to a potential car thief, thus achieving a deterrent effect.

At least partially recessing the steering wheel into the casing of the display instrument is an advantageous measure because the space of the display instrument casing already has a recess that is readily accessible for the steering wheel because of its location and design.

If the contour of the casing at least partially conforms to the outside contour of the steering wheel, an especially space-saving arrangement can be implemented in this way.

If the steering wheel can also be displaced or pivoted in a direction approximately perpendicular to the steering column, then the steering wheel has a maximum of possible adjustments, so the driver has a great freedom in adjusting the steering wheel when entering or exiting the vehicle and also in setting the desired steering wheel position.

DETAILED DESCRIPTION

Figure 1:
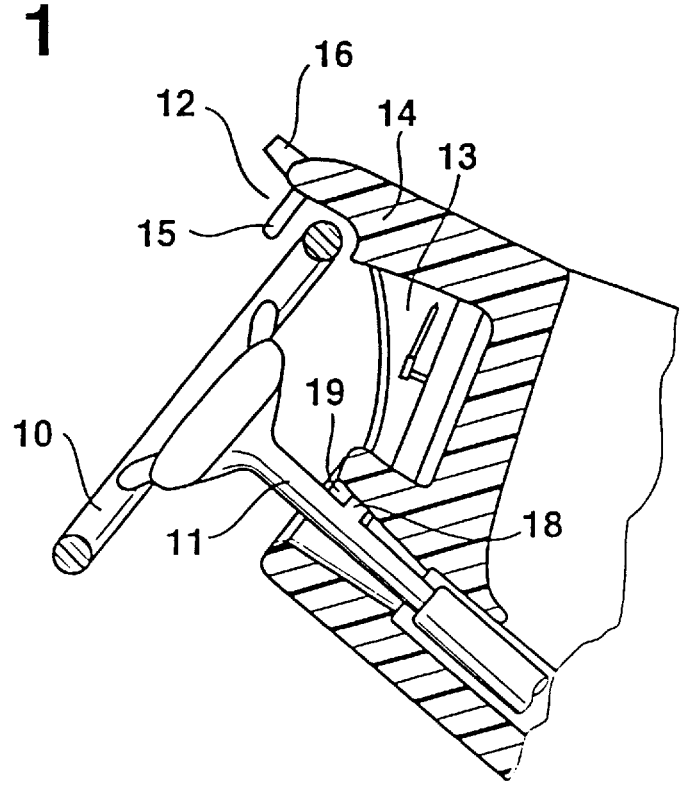
FIG. 1 illustrates an adjusting device in the retracted state according to an embodiment of the present invention.

FIG. 1 shows a cut-away schematic side view of a steering wheel 10, for example, in an automobile interior; it is rotatably mounted on a steering column 11. Steering wheel 10 is partially in front of a display instrument 13 which is arranged in a casing 14. Steering column 11 is also mounted in casing 14 of display instrument 13. A locking device 12 which has a lock bar element 15 is also mounted on casing 14. Furthermore, tumbler lock 16 is provided on casing 14 to operate locking device 12. Steering wheel 10 can be displaced together with steering column 11 in a direction approximately parallel to steering column 11. For example, steering column 11 may be designed as a telescoping column. When pushed in, steering wheel 10 projects partially into casing 14. Lock bar element 15 is then in front of steering wheel 10 in such a way that it is possible to move steering wheel 10 with steering column 11 back out only after unlocking lock bar element 15 by operating tumbler lock 16. Furthermore, a detention lug 18 that is inside a recess 19 in casing 14 is mounted on steering column 11. Locking device 12 and the mechanism for adjusting steering wheel 10 in the direction of steering column 11 together form an adjusting device for steering wheel 10.

Figure 2:
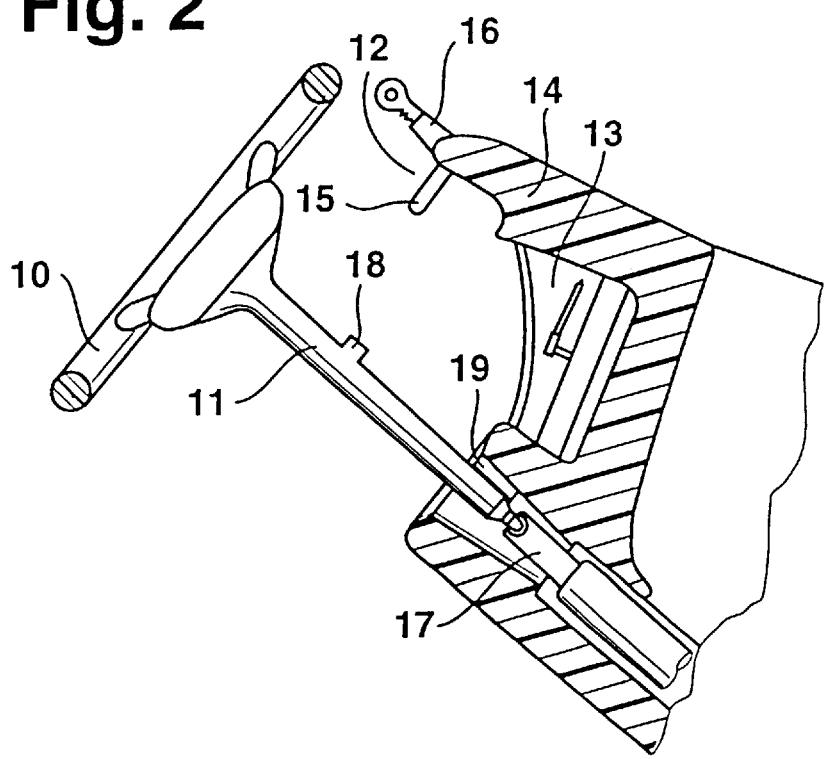
FIG. 2 illustrates the steering wheel of FIG. 1 with the adjusting device in the extended state according to an embodiment of the present invention.

The operation of the adjusting device of steering wheel 10 is explained further in conjunction with FIG. 2.

The diagram in FIG. 2 differs from that in FIG. 1 in that steering wheel 10 with steering column 11 is in the extended position. For this purpose, tumbler lock 16 has been opened with a key, so that lock bar element 15 can be moved out of its locked position. This also unlocks steering wheel 10, so it can be extended. In extending the steering wheel, detention lug 18 separates from recess 19, so that proper steering is possible. A cardan joint 17 which is also provided in steering column 11 is released when the telescoping elements are extended and permits an additional swinging movement of steering column 11.

The arrangement illustrated here can be implemented, for example, by having the telescoping elements be part of a pneumatic spring, and then steering wheel 10 is brought into the retracted position against the spring pressure. The spring pressure of the pneumatic spring can provide automatic extension of steering wheel 10 when lock 16 is unlocked. However, other mechanisms are also possible, such as an active pneumatic or hydraulic movement of steering column 11 or a ratchet mechanism, which can be connected to lock 16, for example, so that extension of the steering wheel is possible only after unlocking, but retraction is possible without operating the lock. A stop is also provided to prevent steering wheel 10 from retracting while driving. In addition, another measure provides for retraction and extension to be essentially dependent upon operation of tumbler lock 16, where tumbler lock 16 may also be combined functionally with the vehicle's ignition lock or designed in one piece with it.

By moving steering wheel 10 in the direction of casing 14, the interior space of the vehicle accessible for the driver is also enlarged. This is an advantage especially when the driver wants to enter or exit from the vehicle. At the same time as steering wheel 10 with steering column 11 retracts into casing 14, locking device 12 is locked and secured by detention lug 18 and recess 19 so that little or no steering movement can be transmitted to the vehicle with steering wheel 10 in the retracted position. Instead of detention lug 18 and recess 19, a mechanically locked connection between steering wheel 10 and the wheels to be steered can also be opened in telescoping column 11 with the retraction of steering wheel 10, so that steering wheel 10 can be turned but has no steering action.

Figure 3:
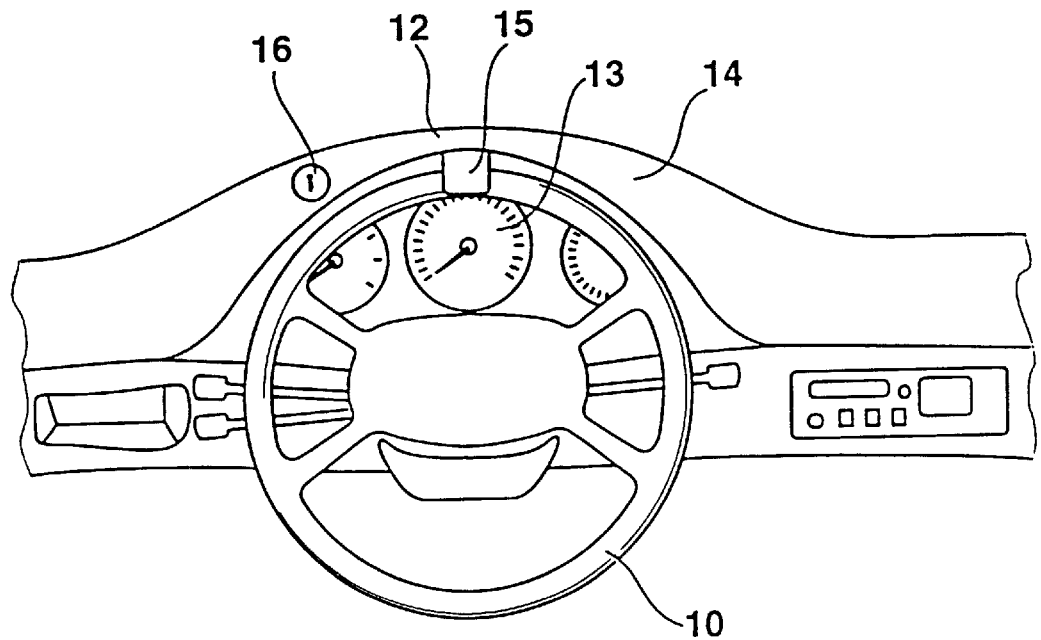
FIG. 3 illustrates a front view of the steering wheel with the adjusting device of FIG. 1 according to an embodiment of the present invention.

FIG. 3 shows a top view of the arrangement illustrated in FIG. 1. The outside contour of steering wheel 10 is adapted to the inside contour of casing 14. This yields an optimum utilization of space and an ideal possibility of implementation for locking steering wheel 10 with lock bar element 15. A positive factor for this positivelocking arrangement in the retracted condition is the fact that display instruments 13 of a known design are usually arranged behind steering wheel 10 anyway and have a generously designed casing 14 for good visibility by the driver. Since the driver does not need to see display instrument 13 when entering or exiting the vehicle or while it is parked, the space in front of display instrument 13 and inside of casing 14 can be used for the retraction of steering wheel 10 without any objections regarding safety. Multiple lugs 18 and/or multiple recesses 19 may be provided to better secure the steering wheel.

Figure 4:
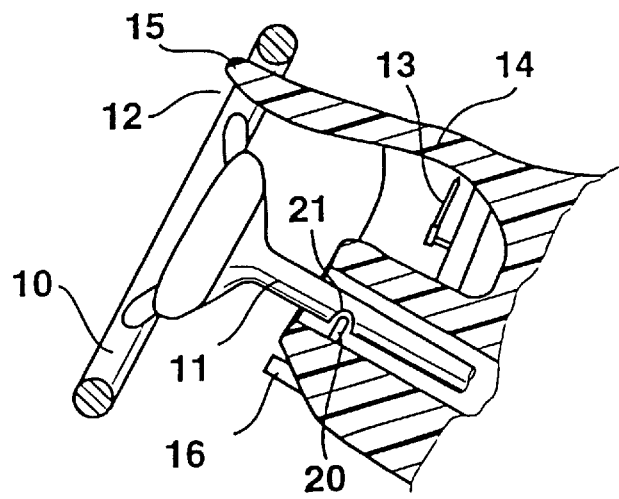
FIG. 4 illustrates another embodiment of a steering wheel with an adjusting device in the retracted state according to the present invention.

FIG. 4 shows another embodiment which uses the same numbering as in the preceding figures. Steering wheel 10 here has a larger diameter, so that it is not appropriate to adjust it to the outside contour of casing 14 in contrast with the embodiment illustrated in FIGS. 1 through 3. In this case, however, part of casing 14 is designed so that it can serve as a lock bar element 15 for locking device 12. Additionally, a ratchet 20 is provided that engages in a recess 21 in steering column 11 as soon as steering wheel 10 has been brought into the retracted state.

The elongated lock bar element 15 automatically goes between the spokes of steering wheel 10 when steering wheel 10 is pushed in, thus preventing normal steering of the vehicle and therefore replacing detention element 18 and recess 19, which are therefore not provided here. Here again, steering wheel 10 cannot be pulled out into its operating position until tumbler lock 16 is unlocked, because ratchet 20 is moved out of recess 21 only when tumbler lock 16 is unlocked. Thus, here again, retraction of steering wheel 10 is combined with locking it. By analogy, depending on the distribution of space in the vicinity of steering wheel 10, the lock can be released by pulling out steering wheel 10 a certain distance because it is possible, by moving steering wheel 10 out of the way, to provide more freedom of movement for the driver, especially for entering and exiting the vehicle. The function of locking steering wheel 10 in the axial direction to steering column 11 and preventing steering can also be accomplished jointly with a single lock bar element 15 if the latter is designed appropriately.

According to another embodiment of the present invention, steering wheel 10 with steering column 11 may also be designed not only to be displaced in the direction parallel to steering column 11 but also to be pivoted or displaced in other directions, as illustrated with cardan joint 17 in FIG. 2, for example. This leaves the driver the freedom, as before, to adjust steering wheel 10 to meet his or her needs and also to maximize the available space when entering and exiting the vehicle.

All locking and/or detention mechanisms can be combined and a plurality can also be arranged.

What is claimed is:

1. A steering wheel mount for a steering wheel of a vehicle, comprising:
    a casing housing at least one display instrument;
    a rotatable steering column having a steering wheel mounted thereon;
    an adjusting device permitting adjustment of a position of the steering wheel toward and away from the casing substantially parallel to the steering column between a first position spaced from the casing and a second position at least partially recessed into the casing; and
    a steering wheel locking device which, when the steering wheel is moved inward toward the casing, locks the steering wheel in the second position and prevents operation of the steering wheel to steer the vehicle, the steering wheel locking device permitting the steering wheel to be moved outward away from the casing toward the first position only after the steering wheel locking device has been unlocked, wherein the steering wheel locking device is permanently mounted to the casing and automatically locks the steering wheel in the second position as soon as the steering wheel is moved into the second position.

2. The steering wheel mount according to claim 1, wherein the steering wheel locking device is arranged on the casing.

3. The steering wheel mount according to claim 1, further comprising:
    at least one lock bar element, the lock bar element which, when the locking device is locked, prevents at least one of displacement of the steering wheel away from the second position and steering via the steering wheel.

4. The steering wheel mount according to claim 1, wherein a contour of the casing is at least partially adapted to an outside contour of the steering wheel.

5. The steering wheel mount according to claim 1, further comprising means for pivoting the steering wheel about an axis substantially perpendicular to the steering column.

6. The steering wheel mount according to claim 1, wherein, when locked, the steering wheel locking device prevents rotation of the steering wheel.

7. The steering wheel mount according to claim 1, wherein, when the steering wheel is moved into the second position, the steering wheel locking device automatically engages at least one of the steering wheel and the steering column to prevent rotation of the steering wheel.

8. The steering wheel mount according to claim 1, wherein, when the steering wheel is moved into the second position, the steering wheel locking device automatically disengages the steering wheel from wheels of the vehicle to prevent steering of the vehicle.

9. A steering wheel mount for a steering wheel of a vehicle, comprising:
    a casing housing at least one display instrument;
    a rotatable steering column having a steering wheel mounted thereon;
    an adjusting device permitting adjustment of a position of the steering wheel toward and away from the casing substantially parallel to the steering column between a first position spaced from the casing and a second position at least Partially recessed into the casing; and a steering wheel locking device which, when the steering wheel is moved inward toward the casing, locks the steering wheel in the second position and prevents operation of the steering wheel to steer the vehicle, the steering wheel locking device permitting the steering wheel to be moved outward away from the casing toward the first Position only after the steering wheel locking device has been unlocked wherein, when the steering wheel is in the second position, a part of the casing extends through the steering wheel so that contact between the steering wheel and the casing prevents rotation of the steering wheel.

10. A steering wheel mount for a steering wheel of a vehicle, comprising:

a casing housing at least one display instrument;

a rotatable steering column having a steering wheel mounted thereon;

an adjusting device permitting adjustment of a position of the steering wheel toward and away from the casing substantially parallel to the steering column between a first position spaced from the casing and a second position at least partially recessed into the casing; and a steering wheel locking device which, when the steering wheel is moved inward toward the casing, locks the steering wheel in the second position and prevents operation of the steering wheel to steer the vehicle, the steering wheel locking device permitting the steering wheel to be moved outward away from the casing toward the first position only after the steering wheel locking device has been unlocked, wherein one of the steering column and the casing includes a detente mechanism which automatically engages to lock the steering wheel when the steering wheel is moved into the second position and wherein the detente mechanism does not disengage to permit the steering wheel to be moved to the first position until the steering wheel locking device is unlocked.

11. A steering wheel mount for a steering wheel of a vehicle, comprising:

a casing housing at least one display instrument;

a rotatable steering column having a steering wheel mounted thereon;

an adjusting device permitting adjustment of a position of the steering wheel toward and away from the casing substantially parallel to the steering column between a first position spaced from the casing and a second position at least partially recessed into the casing;

means for moving the steering wheel from the second position to the first position; and a steering wheel locking device which, when the steering wheel is moved inward toward the casing, locks the steering wheel in the second position and prevents operation of the steering wheel to steer the vehicle, wherein, when the locking device is unlocked, the steering wheel is moved outward away from the casing toward the first position by the means for moving the steering wheel.

12. The steering wheel mount according to claim 11, wherein the means for moving the steering wheel comprises at least one of a spring biased to urge the steering wheel toward the first position, means for a applying a pneumatic pressure to the steering wheel and means for applying a hydraulic pressure to the steering wheel.

13. A steering wheel mount for a steering wheel of a vehicle, comprising:

a casing housing at least one display instrument;

a rotatable steering column having a steering wheel mounted thereon;

an adjusting device permitting adjustment of a position of the steering wheel toward and away from the casing substantially parallel to the steering column between a first position spaced from the casing and a second position at least partially recessed into the casing; and a steering wheel locking device integrated with an ignition lock of the vehicle, the locking device preventing movement of the steering wheel between the first and second positions when in a locked configuration, wherein, when the locking device is unlocked, the steering wheel may be moved between the first and second positions, and wherein when the steering wheel is locked in the second position, the locking device prevents operation of the steering wheel to steer the vehicle.

* * * * *